United States Patent [19]
Sakurai et al.

[11] Patent Number: 5,603,301
[45] Date of Patent: Feb. 18, 1997

[54] FUEL-INJECTED ENGINE

[75] Inventors: Kenichi Sakurai; Makoto Kawamura, both of Iwata, Japan

[73] Assignee: Yamaha Hatsudoki Kabushiki Kaisha, Iwata, Japan

[21] Appl. No.: 479,674

[22] Filed: Jun. 7, 1995

[30] Foreign Application Priority Data

Jul. 7, 1994 [JP] Japan .................................. 6-179393

[51] Int. Cl.$^6$ .................................................. F02B 17/00
[52] U.S. Cl. ........................ 123/430; 123/585; 123/308
[58] Field of Search ..................... 123/308, 432, 123/430, 531, 585

[56] References Cited

U.S. PATENT DOCUMENTS

| | | | |
|---|---|---|---|
| 5,205,120 | 4/1993 | Obländer et al. | 123/531 |
| 5,295,464 | 3/1994 | Ando et al. | 123/430 |
| 5,421,311 | 6/1995 | Wataya | 123/531 |
| 5,509,397 | 4/1996 | Hoshi | 123/531 |
| 5,520,157 | 5/1996 | Pontoppidan | 123/531 |

FOREIGN PATENT DOCUMENTS

| | | | |
|---|---|---|---|
| 0499268 | 8/1992 | European Pat. Off. | |
| 0539614 | 5/1993 | European Pat. Off. | |
| 3609693 | 10/1986 | Germany | 123/430 |
| 0110814 | 7/1983 | Japan | 123/308 |
| 559952 | 3/1993 | Japan | |

OTHER PUBLICATIONS

European Search Report dated Oct. 23, 1995.
Patent Abstracts of Japan, vol. 16 No. 391 (M–1298) 19 Aug. 1992 & JP–A–04 128534 (Mazda) 30 Apr. 1992.
Patent Abstracts of Japan, vol. 8 No. 146 (M–307), 7 Jul. 1984 & JP–A–59 043922 (Toyota) 12 Mar. 1984.
Patent Abstracts of Japan, vol. 18 No. 512 (M–1679) 27 Sep. 1994 & JP–A–61 073828 (Yamaha) 21 Jun. 1994.

*Primary Examiner*—Erick R. Solis
*Attorney, Agent, or Firm*—Knobbe, Martens, Olson & Bear LLP

[57] ABSTRACT

A fuel injection system for a multi-valve internal combustion engine that includes an arrangement for controlling the fuel spray in response to engine load and speed. As a result, it is possible to obtain stratification under low-speed, low-load conditions and a homogeneous mixture under high-speed, high-load conditions.

16 Claims, 11 Drawing Sheets

FUEL-INJECTED ENGINE

BACKGROUND OF THE INVENTION

This invention relates to a fuel-injected engine and more particularly to an improved induction and fuel-injection system for an internal combustion engine.

In the interest of promoting fuel economy and effective exhaust emission control, it has been proposed to employ fuel-injection as a means of charge forming. In order to permit the use of lower-cost fuel injectors and longer life and reduced servicing, it has been proposed to mount the fuel injector so that it sprays into the intake system of the engine and preferably into the cylinder head intake passage or a point closely adjacent to it. In this way, the advantages of fuel-injection can be obtained without the problems attendant with direct cylinder injection. However, the use of manifold or induction system injection can present some problems, particularly when running under a widely varying speed and load condition.

For example, when the engine is operated at wide open throttle or high loads, it is desirable to provide a relatively homogeneous mixture in the combustion chamber. On the other hand, when operating at low loads and low speeds it is desirable to provide a somewhat stratified charge in the combustion chamber. However, under all running conditions it is essential that there be a stoichiometric mixture at the spark gap at the time of ignition.

Many induction systems are designed so as to provide certain types of turbulence under low-speed, low-load conditions. When turbulence is being generated at low-speed, low-load conditions, it is difficult to maintain stratification of the charge in the combustion chamber. This is particularly true when manifold injection is employed.

Furthermore, many types of induction systems may provide one type of motion in the combustion chamber under one load condition and a different type under another load condition. Thus, fixed fuel-injection systems are not truly capable of ensuring the proper mixture distribution and degree of stratification under these varying conditions.

It is, therefore, a principle object of this invention to provide an improved fuel-injection and induction system for an internal combustion engine.

It is a further object of this invention to provide a fuel-injection system for a manifold injected internal combustion engine wherein the direction of fuel spray can be controlled during engine running and in response to varying load and speed conditions.

In order to improve volumetric efficiency and increase power output, it has been the practice to employ multiple valves per cylinder in an engine. Two intake valves per cylinder are quite common and there is a growing trend toward the use of three intake valves per cylinder. When three intake valves per cylinder are employed, there are normally provided two side intake valves which are disposed closer to a plane containing the axis of the cylinder bore and a third center intake valve that is disposed between the two side valves and further from the plane than the side valves. With this type of induction system it is possible to generate a tumble action from the side intake valves. The center intake valve may generate a reverse tumble which can have a varying effect under the varying speed and loads and can make the problems aforenoted more troublesome.

It is, therefore, a still further object of this invention to provide an improved fuel-injection system for a three intake valve per cylinder engine.

SUMMARY OF THE INVENTION

A first feature of this invention is adapted to be embodied in a fuel-injected internal combustion engine that is comprised of a combustion chamber, intake passage means are provided for delivering an air charge to the combustion chamber. A spark plug is positioned in the combustion chamber for firing a charge therein. A fuel injector is provided for spraying fuel into the intake passage means and therethrough into the combustion chamber. In accordance with this feature of the invention, means are provided for varying the spray path from the fuel-injection means in response to engine running conditions. This means directs the fuel so that it will be concentrated in the area of the spark plug under low-speed, low-load conditions and more homogenous in the combustion chamber under high-speed, high-load conditions.

Another feature of the invention is adapted to be embodied in a fuel-injected internal combustion engine that is comprised of a combustion chamber. Intake passage means deliver an air charge to the combustion chamber through three intake valve seats. These intake valve seats are comprised of a pair of side intake valve seats that are disposed in proximity to a plane containing the axis of the associated cylinder bore and a third center intake valve seat that is disposed between the side valves seats and further from the plane. A fuel injector is supported in the engine and sprays into the intake passage means in a direction toward the valve seats. Means are provided for directing the charge of fuel from the fuel injector toward the center intake valve seat when operating under low-speed, low-load conditions and toward the side intake valve seats when operating under high-speed, high-load conditions.

DETAILED DESCRIPTION OF THE PREFERRED EMBODIMENTS OF THE INVENTION

Figure 1:
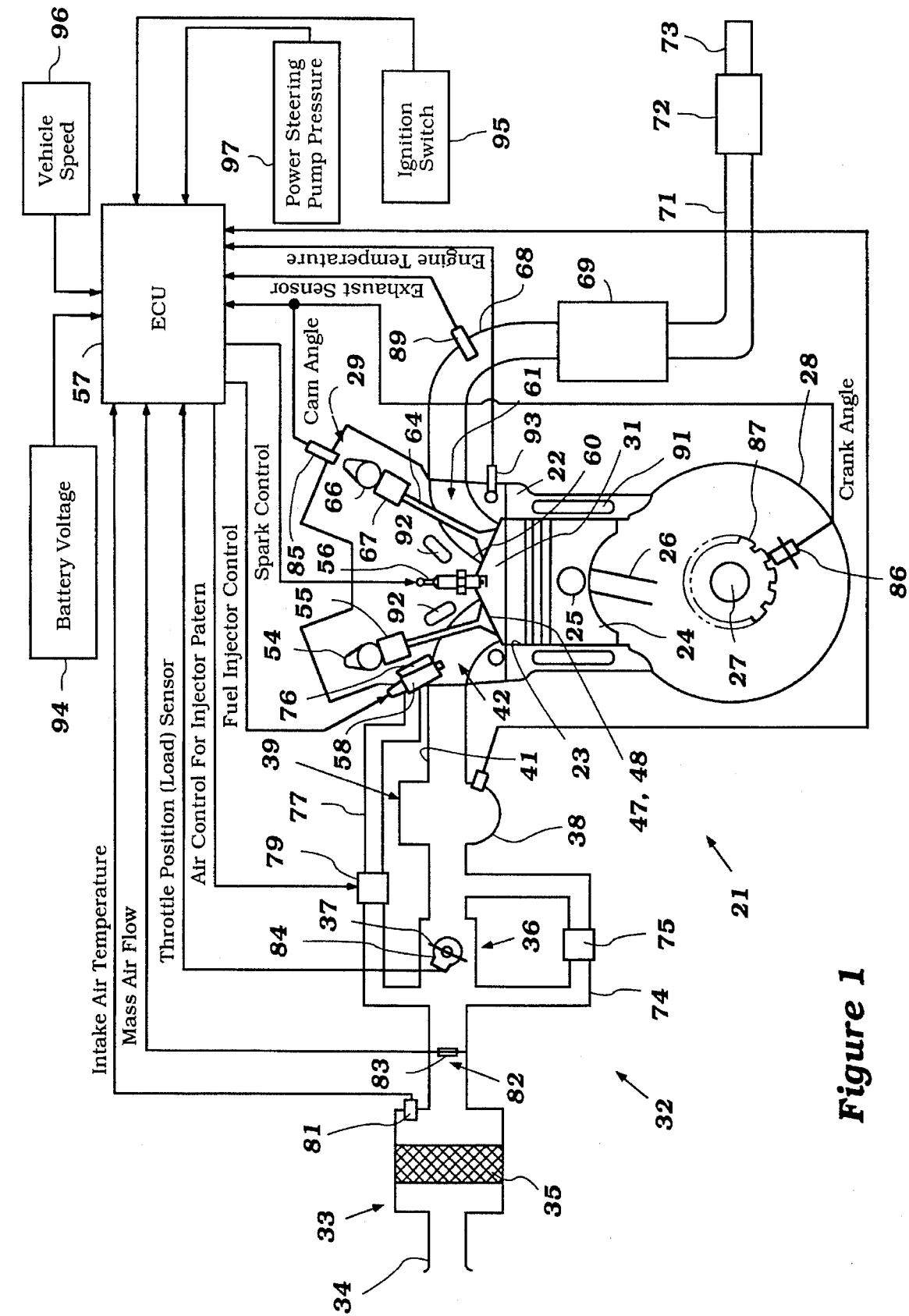
FIG. 1 is a partially schematic cross-sectional view taken through a single cylinder of an internal combustion engine constructed in accordance with an embodiment of the invention.
Figure 2:
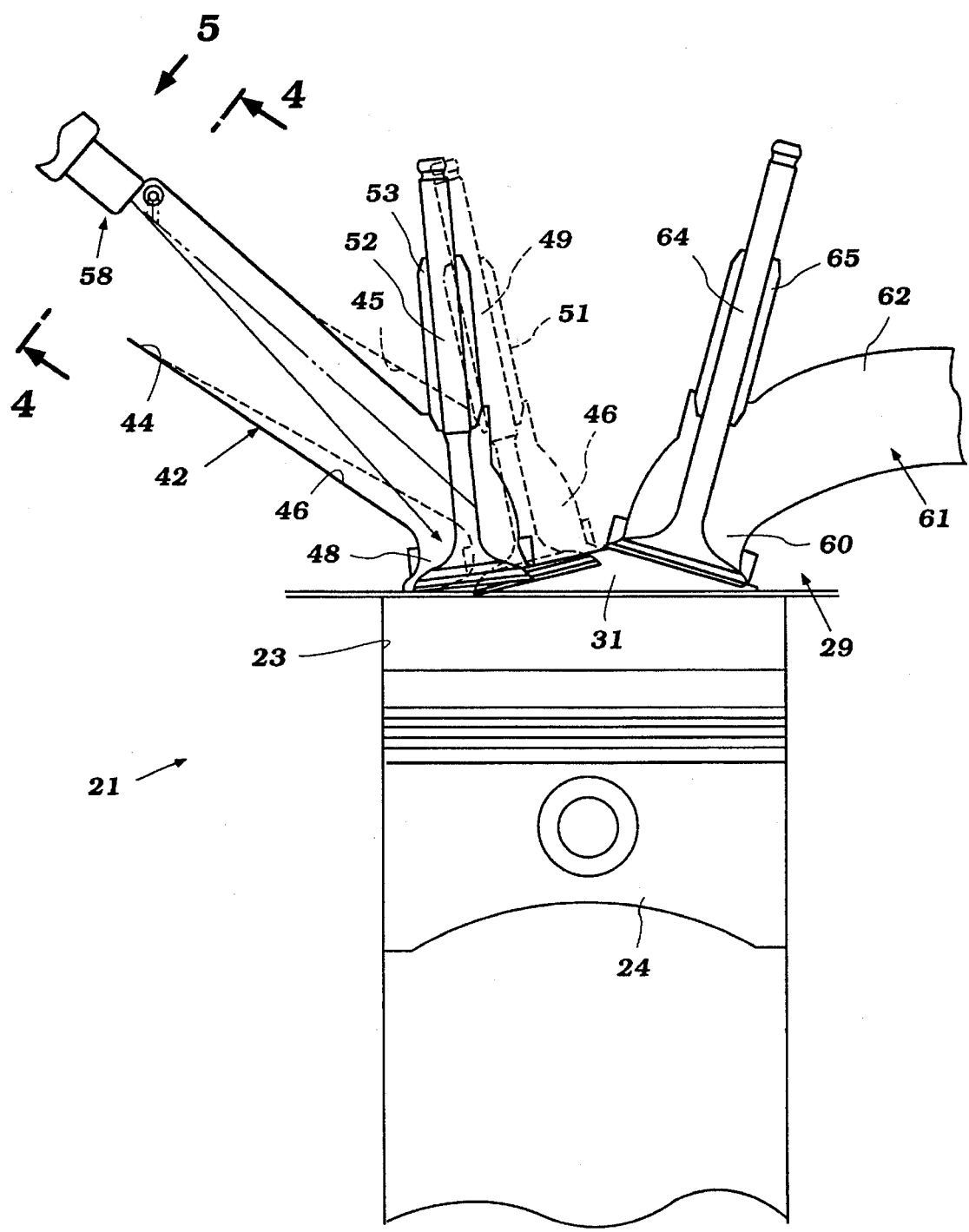
FIG. 2 is an enlarged cross-sectional view, looking in the same direction as FIG. 1 and showing in more detail the relationship of the fuel injector and intake passages.

Referring now in detail to the drawings and initially primarily to FIGS. 1 and 2, an internal combustion engine constructed in accordance with an embodiment of the invention is identified generally by the reference numeral 21. The engine 21 is of the multi-cylinder in-line type. However, since the invention deals primarily with the induction and fuel-injection system for the engine, the engine 21 has not been shown completely and in some regards has been shown only schematically. It is believed that this description will be adequate to permit those skilled in the art to practice the invention. In addition, those persons skilled in the art will readily understand how the invention can be employed with engines having other cylinder numbers and other configurations. Therefore, where any details of the engine 29 are not illustrated or described, they may be considered to be of any conventional type.

The engine 21 is comprised of a cylinder block 22 in which one or more cylinder-bores 23 are formed. Pistons 24 reciprocate in each cylinder bore 23 and are connected by means of piston pins 25 to the upper or small ends of respective connecting rods 26. The lower ends of the connecting rods 26 are journaled on respective throws of a crankshaft 27. The crankshaft 27 is rotatably journaled within a crankcase journal formed by the skirt of the cylinder block 22 and a crankcase member 28 that is affixed thereto. This journaling of the crankshaft 27 may be of any known type.

A cylinder head assembly, indicated generally by the reference numeral 29 is affixed to the cylinder block 22 in any well known manner. The cylinder head 29 is provided with recesses 31 which cooperate with the heads of the pistons 24 and the cylinder bore 23 to form the combustion chambers of the engine.

An induction and charge-forming system, indicated generally by the reference numeral 32 is provided for supplying an air and fuel charge to the combustion chamber 31. This induction system includes an air inlet device 33 which has an atmospheric air inlet opening 34 through which air is drawn from the atmosphere. A filter 35 in the air inlet device 33 filters the intake air. The thus filtered air is then delivered to a throttle body, indicated generally by the reference numeral 36. A throttle valve 37 is positioned in the throttle body 36 and controls the flow through it in a known manner in response to operator demand.

Figure 3:
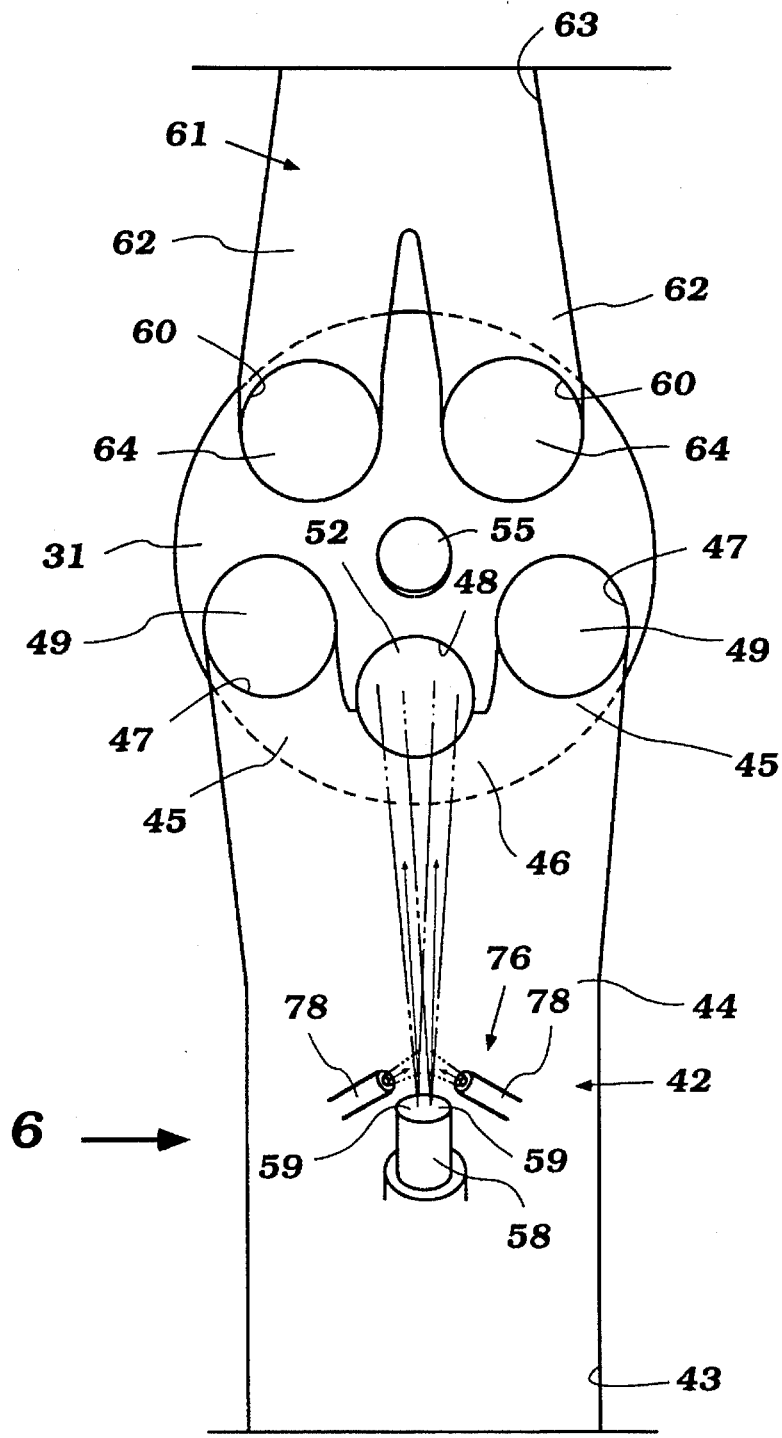
FIG. 3 is a cross-sectional view taken along a plane extending perpendicular to the plane of FIG. 2 and through the induction system to show the relationship of the fuel injector to the intake valve seats.

The throttle body 36 delivers the intake air to a plenum chamber 38 of an intake manifold, indicated generally by the reference numeral 39. The intake manifold 39 has a plurality of runner sections 41 which extend from the plenum chamber 38 to cylinder head intake passages, indicated generally by the reference numeral 42. These intake passages 42 have a configuration as best shown in FIGS. 2 and 3. The intake passages 42 each include an individual inlet opening 43 from which a common intake passage 44 extends toward the combustion chamber 31. This common passage 44 then is divided into three portions comprised of a pair of side portions 45 and a center portion 46.

The side portions 45 terminate at a pair of side valve seats 46 which are juxtaposed to a plane containing the axis of the cylinder bore 23 and extending parallel to the axis of rotation of the crankshaft 27. In fact, the side intake valve seats 47 may extend slightly over this plane.

The center intake passage portion 46 terminates at a center intake valve seat 48 that is disposed further from the aforenoted plane and is disposed generally between the side valve seats 47.

A pair of poppet-type side intake valves 49 are slidably supported within the cylinder head 29 within valve guides 51 formed therein. These side intake valves 49 reciprocate along axes that lie in a common plane that is disposed at an acute angle to the aforenoted plane containing the axis of the cylinder bore 23.

In a similar manner, a poppet-type center intake valve 52 is slidably supported in a valve guide 53 in the cylinder head 29 and cooperates with the center intake valve seat 48. The center intake valve 52 reciprocates in about an axis that is disposed at an acute angle to the aforenoted plane containing the axis of the cylinder bore 23. This acute angle is less than the acute angle defined by the plane in which the side intake valves 49 reciprocate.

The poppet-type intake valves 52 are operated in a known manner by means that includes an intake camshaft 54 that is journaled in the cylinder head 29 in a known manner and which operates the respectively valves through thimble tappets 55.

The configuration of the side intake passages 45, the valve seats 47, and the intake valves 49 is such that the charge which enters the combustion chamber through these passages is directed toward the opposite side of the cylinder bore 23 so as to generate a clockwise tumble motion. The center intake passage 46, valve seat 48, and intake valve 52 is disposed so as to direct the flow in a generally axial direction into the combustion chamber, but can generally some reverse tumble motion in a counterclockwise direction.

A spark plug, indicated generally by the reference numeral 56, is mounted centrally in the combustion chamber recess 31 of the cylinder head 29. The spark plug 56 is fired under the control of an ignition system which is in turn controlled by an ECU shown schematically in FIG. 1 and indicated by the reference numeral 57.

A fuel charge is supplied to the combustion chamber 31 by a manifold or cylinder head fuel injector, indicated generally by the reference numeral 58, which is positioned in the cylinder head 29 in a location so as to spray into the common portion 44 of the cylinder head intake passages 42. As will be described, the fuel injector 58 is provided with a pair of nozzle portions 59, each of which sprays in a generally conical fashion and which spray is directed primarily toward the side intake valve seats 47. However, the direction of flow may be controlled, in accordance with the invention, in a manner which will be described.

The fuel injectors 58 are supplied with fuel from a fuel supply system which may be of any known type. The injectors 58 are preferably electrically operated and are controlled by the ECU 57 in accordance-with any desired control strategy. Some of the components for the engine management system, including the control of the fuel injectors 58 and the spark plugs 56 by the ECU 57, will be described later.

On the side of the plane containing the cylinder bore axis 23 opposite the side intake valve seats 47 and center intake valve seat 48 there are provided a pair of exhaust valve seats 60. These exhaust valve seats 60 communicate with a cylinder head exhaust passage 61, which in the illustrated embodiment is of the Siamesed type and includes a pair of branch portions 62 which extend from each valve seat 59 to a common portion 63 that exits the cylinder head 29 on the side opposite the intake passages 42.

Poppet-type exhaust valves 64 are supported for reciprocation within the cylinder head 29 by valve guides 65. These exhaust valves 64 are operated by an exhaust camshaft 66 in a known manner through thimble tappets 67.

The cylinder head exhaust passages 61 communicate with an exhaust manifold 68 that is affixed to the exhaust side of the cylinder head 29 and which delivers the exhaust gases to a catalytic converter 69. The catalytic converter may be of any known type such as employing a three-way catalyst for treatment of the exhaust gases. The exhaust gases are delivered from the catalytic converter 69 to an exhaust pipe 71, which in turn extends to a muffler 72 for silencing the exhaust gases and then discharging them to the atmosphere through a tailpipe 73.

Returning again to the induction system 32, although the idle speed of the engine 21 may be controlled by the position of the throttle valve 37, the particular embodiment illustrated employs an idle air bypass passageway 74 that extends from the upstream side of the throttle body 36 to its downstream side so as to bypass the throttle valve 37. An idle speed control valve 75 is positioned in the passageway 74, and its setting will control the idle speed of the engine 21. The idle bypass control valve 75 may be controlled by the ECU or may be positioned manually.

It has been previously noted that the injector nozzle ports 59 of the fuel injector 58 are disposed so that their fan-like spray will be delivered primarily toward the side intake valve seats 47. Because of the conical configuration of this spray, each port 59 will also direct a portion of the spray toward the center intake valve seat 48. This provides a homogeneous mixture of fuel in the combustion chamber. Such a homogeneous mixture is particularly advantageous when operating at high-speed, high-load conditions.

Figure 4:
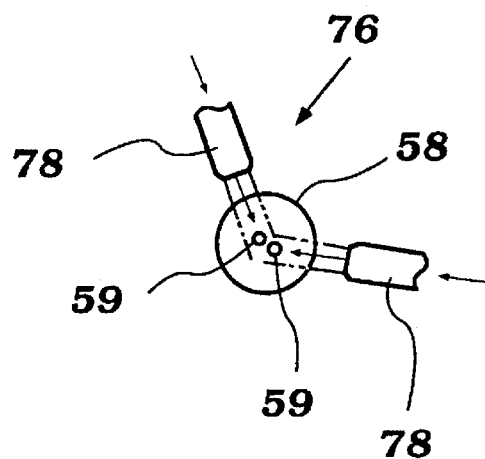
FIG. 4 is a cross-sectional view taken in the direction of the line 4—4 in FIG. 2 and shows how the fuel injector spray pattern is controlled under low-speed, low-load conditions.
Figure 5:
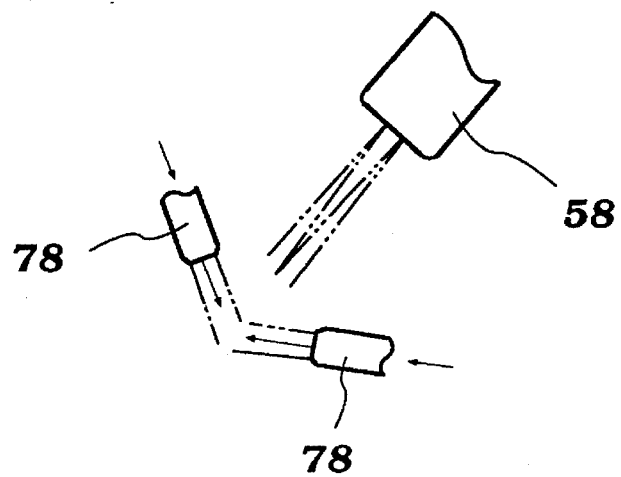
FIG. 5 is a view looking in the direction of the arrow 5 in FIG. 2 and also shows how the fuel-injection spray pattern is controlled.

However, under low-speed, low-load conditions it is desired to reduce the amount of fuel supplied to the engine and such a homogeneous mixture may not provide a stoichiometric charge at the spark plug 56 at the time of firing. Therefore, a flow control system, indicated generally by the reference numeral 76, is provided for controlling the actual spray pattern of the fuel injector 58 under various running conditions. That is, the control system 76 is capable of changing the actual spray pattern of the fuel injector 58 while the engine is running. This is done by providing an air system that includes an air assist manifold 77 that extends from the upstream side of the throttle body 36 to a pair of air injector nozzles 78 that are disposed in the cylinder head in angular relationship to the fuel injector 58, and specifically its nozzle portions 59. This relationship appears in most detail in FIGS. 4–6.

An air control valve 79 is provided in the bypass air supply conduit 77 and is controlled by the ECU in accordance with a control strategy which will be described. Basically, when the air control valve 79 is opened, then there will be a pressure difference in the air supply conduit 77. This pressure difference is caused by the atmospheric pressure upstream of the throttle valve 36 and the lower-than-atmospheric pressure that exists in the intake passage 42 during the intake cycle. This will cause a strong air spray pattern in the direction shown in FIGS. 5 and 6 that causes the fuel spray from the nozzle ports 59 to be directed generally toward the center intake valve seat 48, as shown in FIG. 3. As a result, the fuel charge will be concentrated at the center intake valve seat 48, which is aligned with the spark plug 56. Thus, at such time when this control is being exercised, the fuel charge will not be homogeneous, but will be stratified, with its main concentration being at the center intake valve seat 48 and the spark plug 56.

Figure 6:
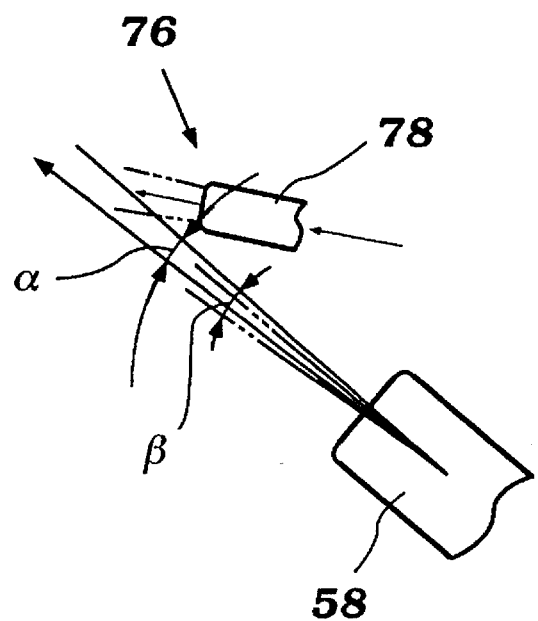
FIG. 6 is a view looking in the direction of the arrow 6 in FIG. 3 and again shows the relationship of the fuel injector spray pattern and the control therefor.
Figure 7:
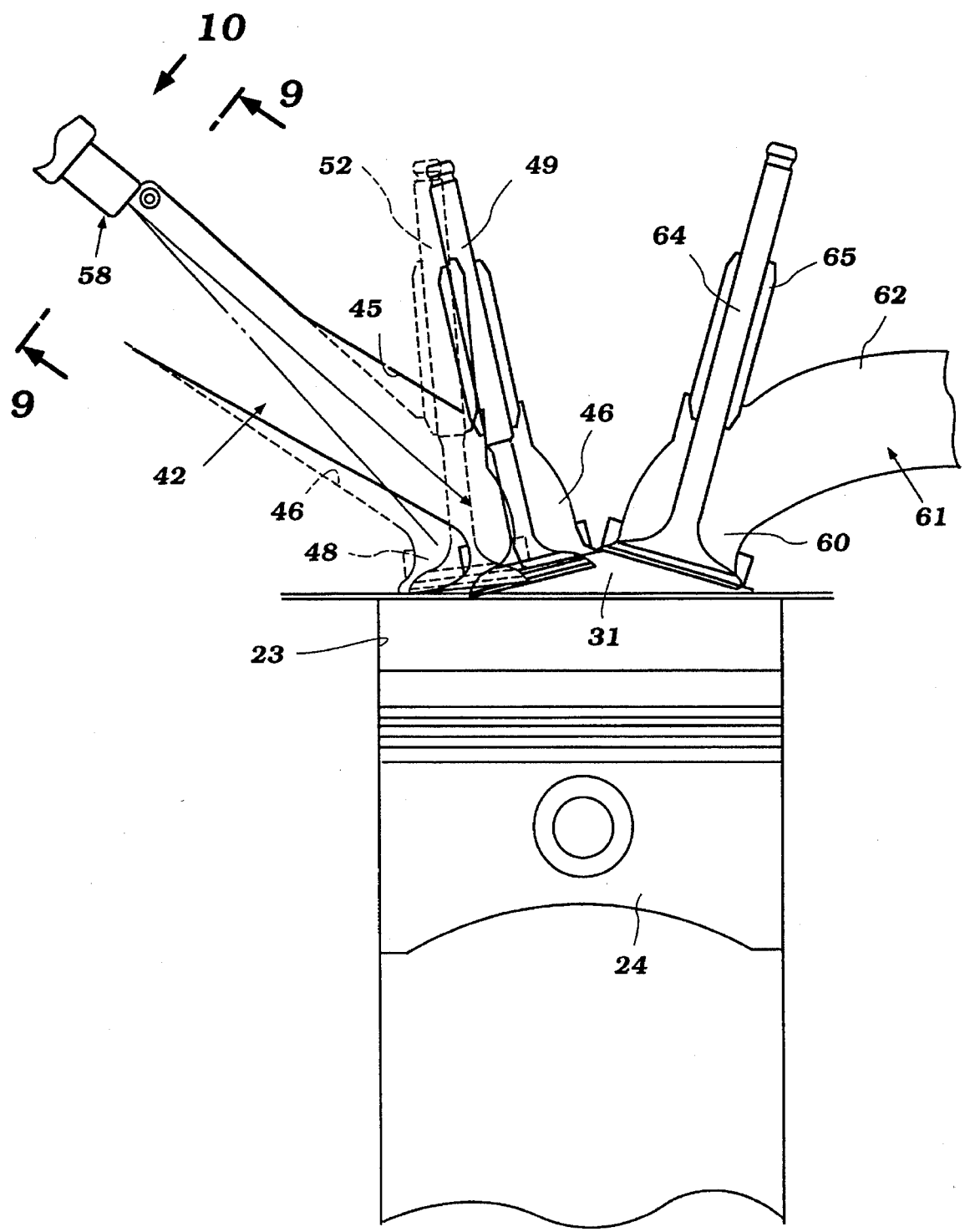
FIG. 7 is a cross-sectional view, in part similar to FIG. 2, and shows the running conditions under high-speed, high-load.
Figure 8:
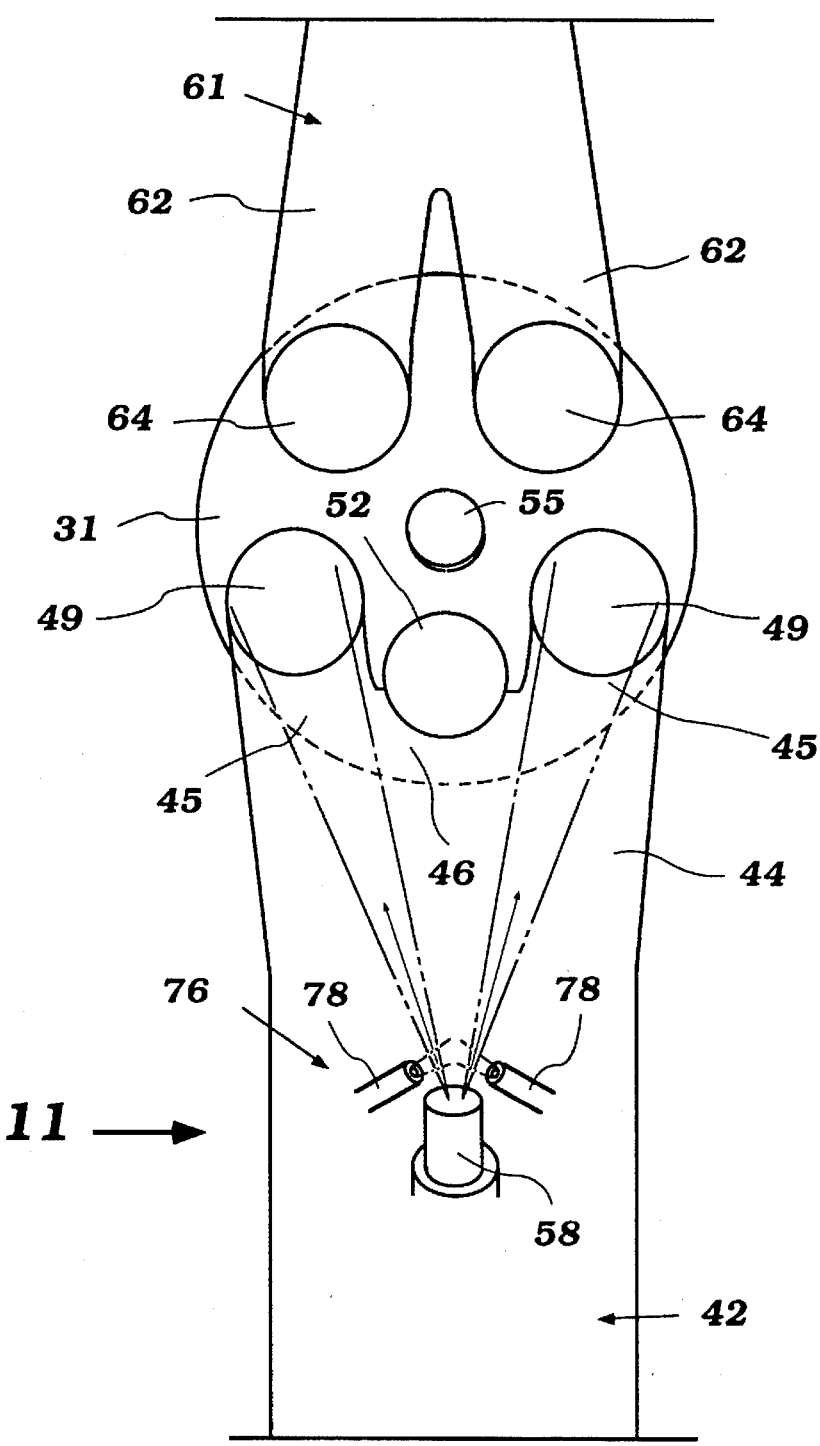
FIG. 8 is a cross-sectional view, in part similar to FIG. 3, and shows the spray pattern under high-speed, high-load conditions.
Figure 9:
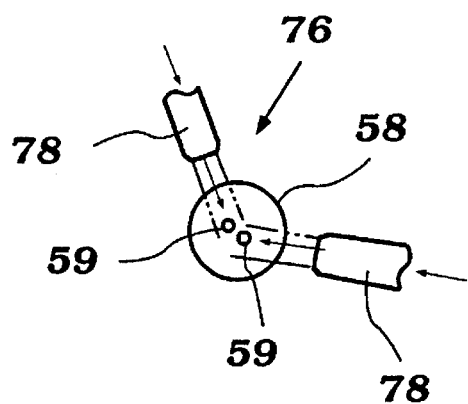
FIG. 9 is a cross-sectional view taken along the line 9—9 of FIG. 7 and is in part similar to FIG. 4 but shows the high-speed, high-load condition.
Figure 10:
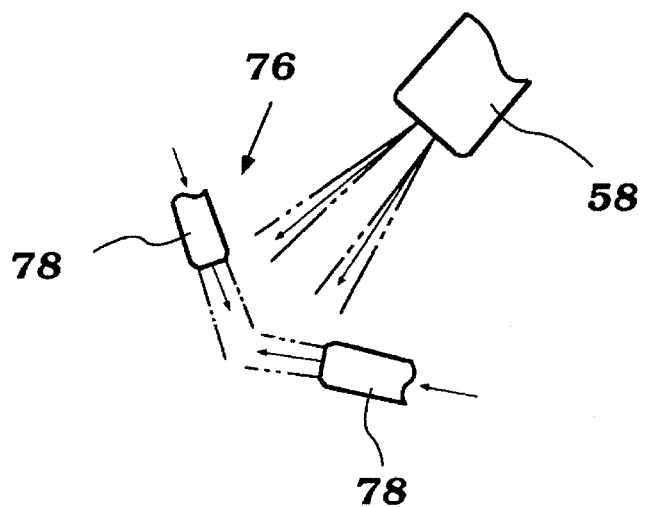
FIG. 10 is a view looking in the direction of the arrow 10 of FIG. 7 under high-speed, high-load conditions.
Figure 11:
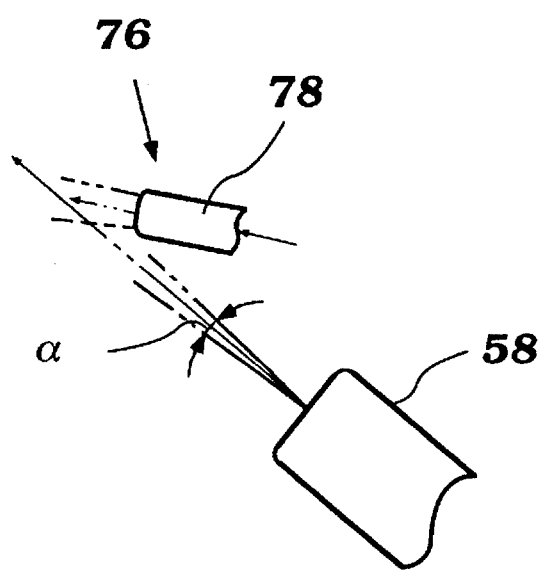
FIG. 11 is a view looking in the direction of the arrow 11 in FIG. 8 and again shows the high-speed, high-load conditions.

It will be seen that the spray is controlled so as to also direct it toward the lower side of the center intake valve seat 48 by deflecting it from the arc α which exists when air pressure is not exerted to the arc β when the air pressure is exerted, as seen in FIG. 6.

Referring now primarily to FIG. 1 and the control system, it has been previously noted that the ECU 57 controls a number of components of the engine, including the timing of firing of the spark plug 56, the timing and duration of spray from the fuel injector 58, and the air control for the fuel injector by controlling the valve 79. In addition, idle speed may also be controlled by controlling the idle air bypass valve 75.

A number of sensors is provided for supplying both atmospheric and engine running conditions to the ECU 57 for this control. Although the basic control may be of any type, the air control for controlling the spray pattern of the fuel injector 78 will be described and is primarily responsive to engine speed and load.

Referring now specifically to FIG. 1, these various sensors include an intake air temperature sensor 81 that is positioned in the air inlet device 33 downstream of the filter element 35. Also, a mass air flow meter, indicated generally by the reference numeral 82, may include a sensor element 83 such as a heated wire device or the like that provides a signal of total mass air flow to the ECU 57.

It has been noted that one of the control parameters is engine load, and load is sensed, in this embodiment by the position of the manually operated throttle valve 37. A throttle position sensor 84 is provided for this purpose.

There is also provided a timing sensor 85 that cooperates with one of the camshafts 54 or 56, the exhaust camshaft 66 in this embodiment, to provide a cam timing angle. In addition, a pulser-type sensor 86 is mounted in the crankcase in proximity to a toothed wheel 87 that is fixed to the crankshaft 27 so as to provide a signal indicative of crank angle and crank speed.

In addition, the ECU 57 provides a feedback control of the air-fuel ratio and also the spark control, and an exhaust condition sensor 88 such as an oxygen sensor is provided in the exhaust manifold 68 upstream of the catalytic converter 69.

The engine 21 is also water cooled, and to this end, the cylinder block 22 is provided with a cooling jacket 91 through which coolant is circulated by means of a coolant pump (not shown). The cylinder head 29 is provided with cooling jackets 92 through which this coolant is also circulated. In addition, the cooling system includes, as is well known in this art, an external heat exchanger for maintaining the desired temperature of the engine 29. This actual running temperature is sensed by an engine temperature sensor 93, which may be mounted, for example, in the cylinder head 29.

The ECU 57 is also powered by and receives a voltage signal from an electrical power source such as a battery 94. An ignition switch 95 controls the supply of electrical power to the various components.

In the illustrated embodiment, the engine 21 may be employed for a vehicle application, and thus there is also provided a vehicle speed sensor 96 and a power steering pump sensor 97 that provide signals indicative of vehicle speed and also of load on accessories such as a power steering pump.

Referring again to the strategy and structure for controlling the spray pattern from the fuel injector 58, the system operates so as to provide air control, which may be atmospheric air as described or air under pressure from an air pump or supercharger (not shown). Basically, under low-speed, low-load conditions the air assist or air control supplies high-pressure air to concentrate the fuel spray toward the center intake valve seat 48 so as to achieve stratification and ensure that a stoichiometric charge will be present at the time of firing of the spark plug 56 and regardless of the turbulence in the combustion chamber. However, as the speed and load increases, the air control is either diminished or reduced, as shown in FIGS. 7–11, and the fuel spray passes more uniformly to the valve seats 47 and 48 to provide a homogeneous mixture.

Figure 12:
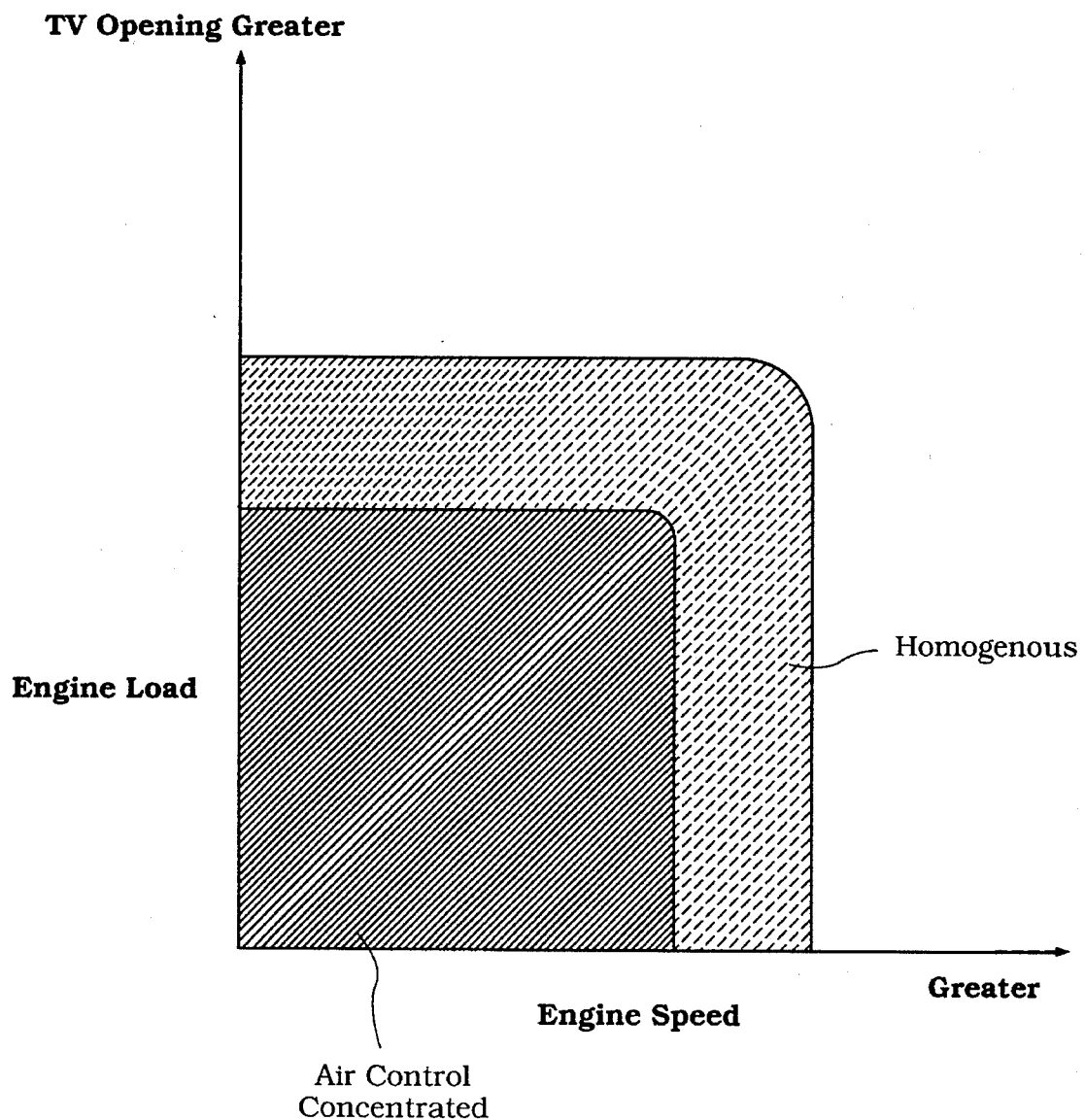
FIG. 12 is a graphical view showing the control ranges for the injector spray pattern under varying engine speed and load conditions with speed being shown on the abscissa and load as represented by throttle valve position being shown on the ordinate.

FIG. 12 shows the control routines where there is air control under lower speeds and lower loads so as to concentrate the mixture at the center valve seat 48. However, as shown in the shaded view, at higher speeds and loads the mixture is more homogeneous so as to provide maximum power output.

In addition to controlling the direction of flow, the air which issues from the control nozzles 78 also helps to atomize the fuel particles, which is particularly helpful under the low-speed, low-load conditions.

Figure 13:
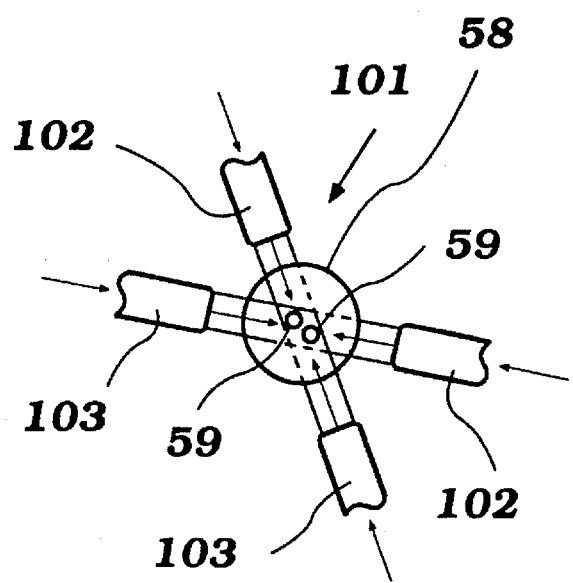
FIG. 13 is a view, in part similar to FIGS. 4 and 9 and shows another embodiment of the invention.

In the embodiment as thus far described, the air control or the control of the spray pattern has been done by two air nozzles 78. FIG. 13 shows another embodiment of the invention wherein there is provided a flow controlling system, indicated generally by the reference numeral 101, which is comprised of four air nozzles, a pair of high-pressure nozzles 102 that are located like the nozzles 78 of the previously described embodiment, and a pair of lower pressure nozzles 103 that are disposed diametrically opposite to the nozzles 102. This provides some further control in the spray pattern and its direction relative to the valve seats which are served.

It should be readily apparent from the foregoing description that the described embodiments of the invention are very effective in permitting manifold fuel injection with control of the direction of the fuel spray under varying engine conditions in a very simple and highly effective manner. Of course, the foregoing description is that of preferred embodiments of the invention, and various changes and modifications may be made without departing from the spirit and scope of the invention as defined by the appended claims.

We claim:

1. A fuel injected internal combustion engine comprised of a combustion chamber, intake passage means for delivering an air charge to said combustion chamber, a spark plug positioned in said combustion chamber for firing a charge therein, a fuel injector for spraying fuel into said intake passage means in a direction toward said combustion chamber, said fuel injection means having a spray pattern for directing the fuel charge toward said combustion chamber in a direction to provide a substantially uniform homogeneous mixture therein, and control means for controlling the spray of fuel from said fuel injection means so as to concentrate the spray in the area of said spark plug under certain engine load and speed conditions.

2. A fuel injected internal combustion engine as in claim 1, wherein the certain conditions comprise low-speed, low-load conditions.

3. A fuel injected internal combustion engine as in claim 1, wherein the means for redirecting the spray comprises at least a pair of air nozzles disposed contiguous to the fuel injector nozzle and supplied with a source of air under pressure for redirecting the fuel spray.

4. A fuel injected internal combustion engine as in claim 3, wherein the fuel injector has a pair of side-by-side nozzle openings, each issuing a conically configured spray pattern in overlapping relationship.

5. A fuel injected-internal combustion engine as in claim 4, wherein the air reduces the angle of the conical spray.

6. A fuel injected internal combustion engine as in claim 5, wherein the certain conditions comprise low-speed, low-load conditions.

7. A fuel injected internal combustion engine as in claim 1, wherein the intake passage means terminates in a pair of side intake valve seats communicating with the combustion chamber and disposed contiguous to a plane containing the axis of the combustion chamber and a third center intake valve seat disposed further from said plane and between said side intake valve seats.

8. A fuel injected internal combustion engine as in claim 7, wherein the fuel injector has a pair of side-by-side nozzle openings, each issuing a conically configured spray pattern in overlapping relationship.

9. A fuel injected internal combustion engine as in claim 8, wherein the means for redirecting the spray comprises at least a pair of air nozzles disposed contiguous to the spray nozzle and supplied with a source of air under pressure for redirecting the fuel spray.

10. A fuel injected internal combustion engine as in claim 9, wherein the spray reduces the angle of the conical spray.

11. A method of operating an internal combustion engine comprised of a cylinder head adapted to be affixed in sealing relationship with an associated cylinder bore and piston for defining a combustion chamber, three intake valve seats formed in said cylinder head and comprised of a pair of side intake valve seats and a center intake valve seat disposed between said side intake valve seats, said side intake valve seats lying closer to a plane containing the axis of the cylinder bore than said center intake valve seat, intake passage means formed in said cylinder head for serving said intake valve seats, a fuel injector mounted in said cylinder head and spraying fuel into said intake passage means and toward said valve seats, said method comprising controlling the spray from said fuel injector in response to an engine condition between a first condition wherein the spray is directed primarily toward the center intake valve seat and a second condition wherein the spray is directed homogeneously to all of the intake valve seats.

12. A method as in claim 11, wherein the first condition comprises low-speed, low-load conditions.

13. A method as in claim 11, wherein the means for redirecting the spray comprises at least a pair of air nozzles disposed contiguous to the fuel injector nozzle and supplied with a source of air under pressure for redirecting the fuel spray.

14. A method as in claim 13, wherein the fuel injector has a pair of side-by-side nozzle openings, each issuing a conically configured spray pattern in overlapping relationship.

15. A method as in claim 14, wherein the air reduces the angle of the conical spray.

16. A method as in claim 15, wherein the certain conditions comprise low-speed, low-load conditions.

* * * * *